(12) United States Patent
Nishikawa et al.

(10) Patent No.: US 11,333,043 B2
(45) Date of Patent: May 17, 2022

(54) STEAM TURBINE PLANT

(71) Applicant: Mitsubishi Hitachi Power Systems, Ltd., Yokohama (JP)

(72) Inventors: Toyoharu Nishikawa, Tokyo (JP); Soichiro Tabata, Yokohama (JP); Tadashi Takahashi, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 309 days.

(21) Appl. No.: 16/482,911

(22) PCT Filed: Feb. 16, 2018

(86) PCT No.: PCT/JP2018/005510
§ 371 (c)(1),
(2) Date: Aug. 1, 2019

(87) PCT Pub. No.: WO2018/151259
PCT Pub. Date: Aug. 23, 2018

(65) Prior Publication Data
US 2019/0353055 A1 Nov. 21, 2019

(30) Foreign Application Priority Data
Feb. 17, 2017 (JP) .............................. JP2017-027918

(51) Int. Cl.
*F01K 7/20* (2006.01)
*F01D 11/04* (2006.01)
(Continued)

(52) U.S. Cl.
CPC ................ *F01K 7/20* (2013.01); *F01D 11/04* (2013.01); *F01D 25/24* (2013.01); *F16J 15/4472* (2013.01)

(58) Field of Classification Search
CPC ..... F01K 7/20; F01K 7/18; F01K 7/10; F01K 7/12; F01D 11/04
See application file for complete search history.

(56) References Cited

U.S. PATENT DOCUMENTS 3,390,525 A   7/1968   Spillmann
4,793,141 A   12/1988  Yanai et al.
(Continued)

FOREIGN PATENT DOCUMENTS

DE       1476766 A1    6/1969
JP       S48-054302 A  7/1973
(Continued)

OTHER PUBLICATIONS

International Search Report dated May 1, 2018, issued in counterpart application No. PCT/JP2018/005510, with English translation. (4 pages).
(Continued)

*Primary Examiner* — Michael L Sehn
(74) *Attorney, Agent, or Firm* — WHDA LLP

(57) ABSTRACT

A steam turbine plant includes high-pressure gland portions, low-pressure gland portions, a gland regulator line, and a rotor-driving steam supply line. The high-pressure gland portions supply gland steam to gaps of ends of a high-pressure turbine rotor, and thereby seal the gaps. The low-pressure gland portions supply the gland steam to gaps of ends of a low-pressure turbine rotor, and thereby seal the gaps. The gland regulator line guides the gland steam from the high-pressure gland portion to the low-pressure gland portion. The rotor-driving steam supply line branches off from the gland regulator line, and supplies some of the gland steam to a main steam flow passage in a low-pressure casing.

4 Claims, 6 Drawing Sheets

(51) Int. Cl.
*F01D 25/24* (2006.01)
*F16J 15/447* (2006.01)

(56) References Cited

U.S. PATENT DOCUMENTS

2010/0008756 A1* 1/2010 Inomata ................. F01D 25/12
  415/14
2013/0156540 A1 6/2013 Donkada et al.

FOREIGN PATENT DOCUMENTS

| | | |
|---|---|---|
| JP | S54-047012 A | 4/1979 |
| JP | 01-071102 U | 5/1989 |
| JP | 2002-129907 A | 5/2002 |
| JP | 2004-143962 A | 5/2004 |
| JP | 2013-053569 A | 3/2013 |
| JP | 2013-124661 A | 6/2013 |
| JP | 2015-145645 A | 8/2015 |
| JP | 5804985 B2 | 11/2015 |

OTHER PUBLICATIONS

Written Opinion dated May 1, 2018, issued in counterpart application No. PCT/JP2018/005510, with English translation. (12 pages).

* cited by examiner

STEAM TURBINE PLANT

TECHNICAL FIELD

The present invention relates to a steam turbine plant having a plurality of steam turbines.

Priority is claimed on Japanese Patent Application No. 2017-027918, filed Feb. 17, 2017, the content of which is incorporated herein by reference.

BACKGROUND ART

In a steam turbine, ends of a rotational shaft of a rotor pass through openings formed in a casing and protrude outside the casing. In such a steam turbine, sealability is secured at the ends of the rotational shaft by passing steam through gaps between the openings of the casing and the rotational shaft. In the case of a steam turbine plant having a high-pressure side steam turbine and a low-pressure side steam turbine, an interior of a turbine casing of the high-pressure side steam turbine has a higher pressure than atmospheric pressure. For this reason, steam (hereinafter, this steam is appropriately referred to as gland steam) flows out from the interior of the turbine casing toward an exterior of the turbine casing through gaps between openings of the casing and a rotational shaft at ends of the rotational shaft of the high-pressure side steam turbine, and thereby sealability is secured at the ends of the rotational shaft. On the other hand, an interior of a turbine casing of the low-pressure side steam turbine has a lower pressure than atmospheric pressure. For this reason, in the low-pressure side steam turbine, air easily enters from an exterior to the interior of the casing through gaps between openings of the casing and the rotational shaft. Thus, the gland steam that has passed the gaps between the openings of the casing of the high-pressure side steam turbine and the ends of the rotational shaft of the high-pressure side steam turbine is supplied to the gaps between the openings of the casing of the low-pressure side steam turbine and the rotational shaft of the low-pressure side steam turbine, and thereby sealability is secured at the ends of the rotational shaft.

Meanwhile, in the steam turbine plant as described above, a flow rate of the gland steam supplied from the high-pressure side steam turbine to the low-pressure side steam turbine varies depending on a working condition of each steam turbine. That is, at the time of starting of the steam turbine plant, the flow rate of the gland steam supplied from the high-pressure side steam turbine to the low-pressure side steam turbine is small. Further, when the steam turbine plant is in a rated operation state, the flow rate of the gland steam supplied from the high-pressure side steam turbine to the low-pressure side steam turbine increases.

For example, a constitution is disclosed in Patent Literature 1 in which, in a case where the flow rate of the gland steam supplied from the high-pressure side steam turbine to the low-pressure side steam turbine exceeds an amount of steam required of the low-pressure side steam turbine, the surplus gland steam is fed into and condensed in the condenser provided in the steam turbine plant.

However, when the surplus gland steam exchanges heat in the condenser, thermal energy which the gland steam has is discarded. Thus, a constitution in which the surplus gland steam is supplied to a gland steam condenser that exchanges heat with water coming out of the condenser is also disclosed in Patent Literature 1. According to this constitution, efficiency of the thermal energy can be enhanced by supplying the surplus steam to the gland condenser, compared to the case where the surplus gland steam is fed into the condenser.

CITATION LIST

Patent Literature

[Patent Literature 1]
Japanese Unexamined Patent Application, First Publication No. 2002-129907

SUMMARY OF INVENTION

Technical Problem

However, in the technique described in Patent Literature 1, since the surplus gland steam is discharged to the condenser or the gland condenser, it is impossible to be certain that the gland steam can be effectively used, and there is room for improvement in the efficiency of the plant.

Therefore, an object of the present invention is to provide a steam turbine plant capable of achieving an effective use of gland steam, and improving efficiency thereof.

Solution to Problem

A steam turbine plant as an aspect according to the present invention in order to achieve the above object includes: a high-pressure side steam turbine configured to have a high-pressure casing into which steam is configured to flow and a high-pressure turbine rotor which is provided in the high-pressure casing, both ends of which face outward from openings formed in the high-pressure casing, and which is configured to be rotated by the steam flowing into the high-pressure casing; and a low-pressure side steam turbine configured to have a low-pressure casing into which the steam exhausted from the high-pressure side steam turbine is configured to flow and a low-pressure turbine rotor which is provided in the low-pressure casing, both ends of which face outward from openings formed in the low-pressure casing, and which is configured to be rotated by the steam flowing into the low-pressure casing. The high-pressure side steam turbine has high-pressure gland portions that are configured to supply the steam to gaps between the openings of the high-pressure casing and the ends of the high-pressure turbine rotor as gland steam and thereby are configured to seal the gaps. The low-pressure side steam turbine has low-pressure gland portions that are configured to supply the gland steam to gaps between the openings of the low-pressure casing and the ends of the low-pressure turbine rotor and thereby are configured to seal the gaps. The steam turbine plant further includes a gland regulator line configured to guide the gland steam from the high-pressure gland portions to the low-pressure gland portions, and a rotor-driving steam supply line configured to branch off from the gland regulator line and to supply some of the gland steam to a flow passage of the steam that rotates the low-pressure turbine rotor in the low-pressure casing.

According to this constitution, some of the gland steam fed from the high-pressure gland portions of the high-pressure side steam turbine into the low-pressure gland portions of the low-pressure side steam turbine is supplied to a flow passage of the steam that rotates the low-pressure turbine rotor in the low-pressure casing of the low-pressure side steam turbine. Thereby, some of the gland steam can be used as energy that rotates the low-pressure turbine rotor. In this way, the low-pressure turbine rotor is directly rotated by the gland steam, and thereby a loss is also small, and the gland steam can be effectively used.

Further, the rotor-driving steam supply line may be configured to supply some of the gland steam to a portion that is located in the low-pressure casing and at which a pressure is lower than the gland steam supplied from the gland regulator line.

According to this constitution, the gland steam can be efficiently supplied into the low-pressure casing through the rotor-driving steam supply line, and a flow velocity of the gland steam fed into the low-pressure casing is also raised. Thereby, the low-pressure turbine rotor can be more efficiently rotated.

Further, the steam turbine plant may be configured to include a flow control valve that adjusts a flow rate of the gland steam flowing along the rotor-driving steam supply line.

According to this constitution, depending on an amount required in the low-pressure side steam turbine, an amount of supply of the gland steam into the low-pressure casing of the low-pressure steam turbine can be adjusted.

Further, the steam turbine plant may include a correlation value detector that detects a steam flow rate correlation value that correlates to a flow rate of the gland steam flowing along the gland regulator line. The flow control valve may be configured to be open when the steam flow rate correlation value detected by the correlation value detector is greater than or equal to a preset value.

According to this constitution, the flow rate of the gland steam flowing along the gland regulator line varies depending on an operation state of the high-pressure side steam turbine or the low-pressure side steam turbine. For example, at the time of starting of the steam turbine plant, the flow rate of the gland steam flowing along the gland regulator line is small. After the starting of the steam turbine plant, as the number of rotations of the operation of the high-pressure side steam turbine or the low-pressure side steam turbine increases, the flow rate of the gland steam flowing along the gland regulator line increases. In this state, a flow rate of the gland steam sent out of the high-pressure side steam turbine may exceed a flow rate of the gland steam required in the low-pressure side steam turbine, and excessive gland steam may be generated. In a case where the excessive gland steam is generated in this way, the flow rate of the gland steam flowing along the rotor-driving steam supply line is increased, and thereby the excessive gland steam can be effectively used as driving energy for rotating the low-pressure turbine rotor of the low-pressure side steam turbine.

Further, the low-pressure side steam turbine may include: a plurality of stages of turbine vane rows that are fixed to an inner circumferential side of the low-pressure casing and are provided to be spaced apart from one another in a direction of an axis of the low-pressure turbine rotor and a plurality of stages of turbine blade rows that are formed at an outer circumferential portion of the low-pressure turbine rotor and are provided to be spaced apart from each of the stages of turbine vane rows in the direction of the axis. The rotor-driving steam supply line may be configured to be connected into the low-pressure casing on an upstream side of the second and subsequent stages of turbine vane rows excluding a most upstream side of a flow direction of the steam in the low-pressure casing, and on a downstream side of the turbine blade row disposed adjacent to the upstream side of these turbine vane rows among the plurality of stages of turbine vane rows.

According to this constitution, the gland steam supplied into the low-pressure casing through the rotor-driving steam supply line is fed on the downstream side of the turbine blade row that is the upstream side of the turbine vane row, and thereby the fed gland steam can be prevented from obstructing rotation of the turbine blade row.

Further, the low-pressure side steam turbine may include: a plurality of stages of turbine vane rows that are fixed to an inner circumferential side of the low-pressure casing and are provided to be spaced apart from one another in a direction of an axis of the low-pressure turbine rotor; and a plurality of stages of turbine blade rows that are formed at an outer circumferential portion of the low-pressure turbine rotor and are provided to be spaced apart from each of the stages of turbine vane rows in the direction of the axis. The rotor-driving steam supply line may be configured to be connected to the low-pressure casing to face an outside of at least one of the plurality of stages of turbine blade rows in a radial direction.

According to this constitution, the gland steam supplied into the low-pressure casing through the rotor-driving steam supply line is fed from a position that faces the outside of the turbine blade row in the radial direction, and thereby the gland steam can be prevented from obstructing rotation of the turbine blade row.

Further, sealability of a gap between the outer circumferential portion of the low-pressure turbine rotor and an inner circumferential surface of the casing on an outer circumferential side thereof can be improved by the gland steam fed from the rotor-driving steam supply line.

Advantageous Effects of Invention

According to an aspect of the present invention, effective use of the gland steam can be realized, and plant efficiency can be improved.

DESCRIPTION OF EMBODIMENTS

Hereinafter, embodiments for implementing a steam turbine plant according to the present invention will be described with reference to the attached drawings. However, the present invention is not limited to only these embodiments.

First Embodiment

Figure 1:
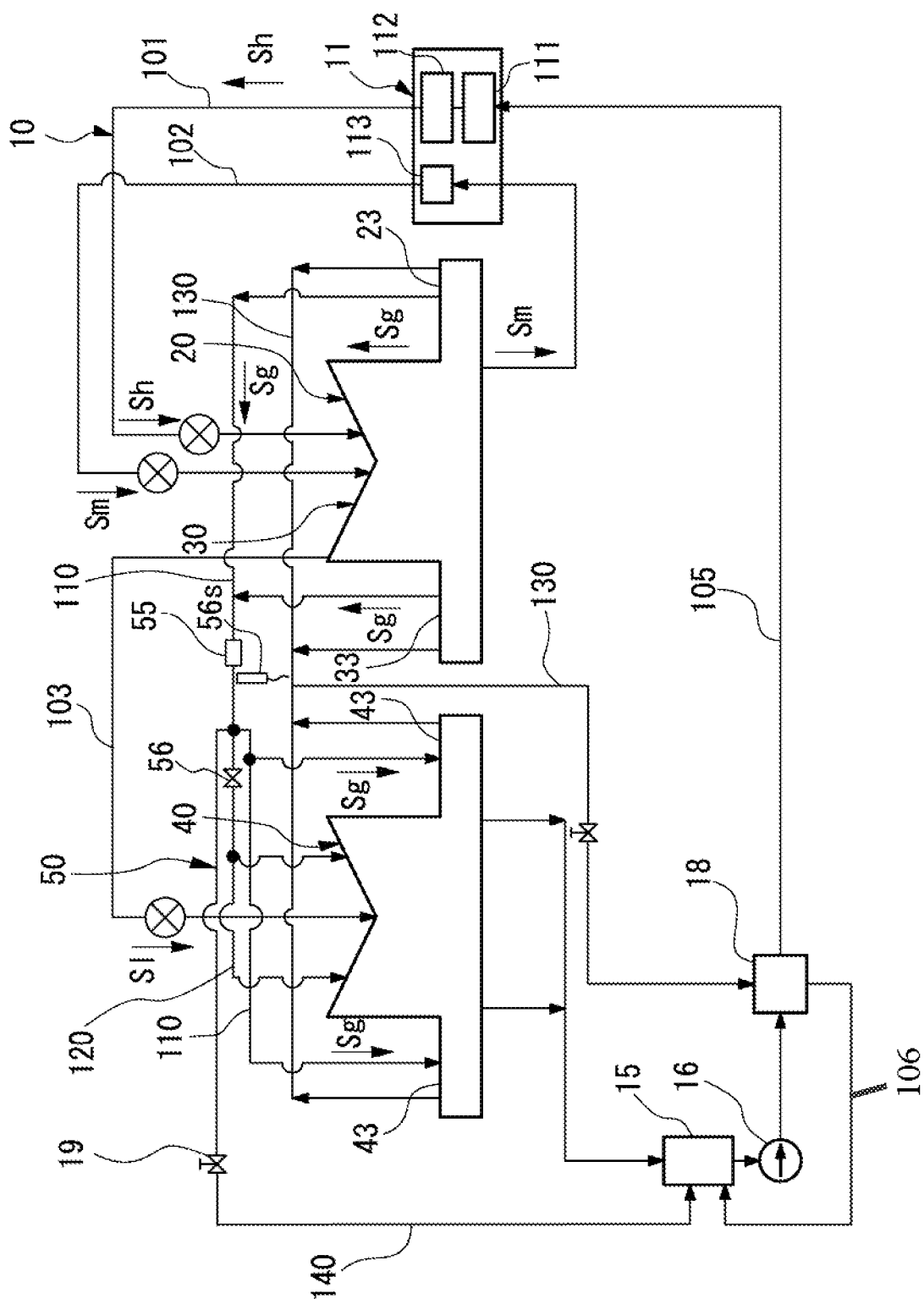
FIG. 1 is a flow sheet of a steam turbine plant in a first embodiment according to the present invention.
Figure 2:
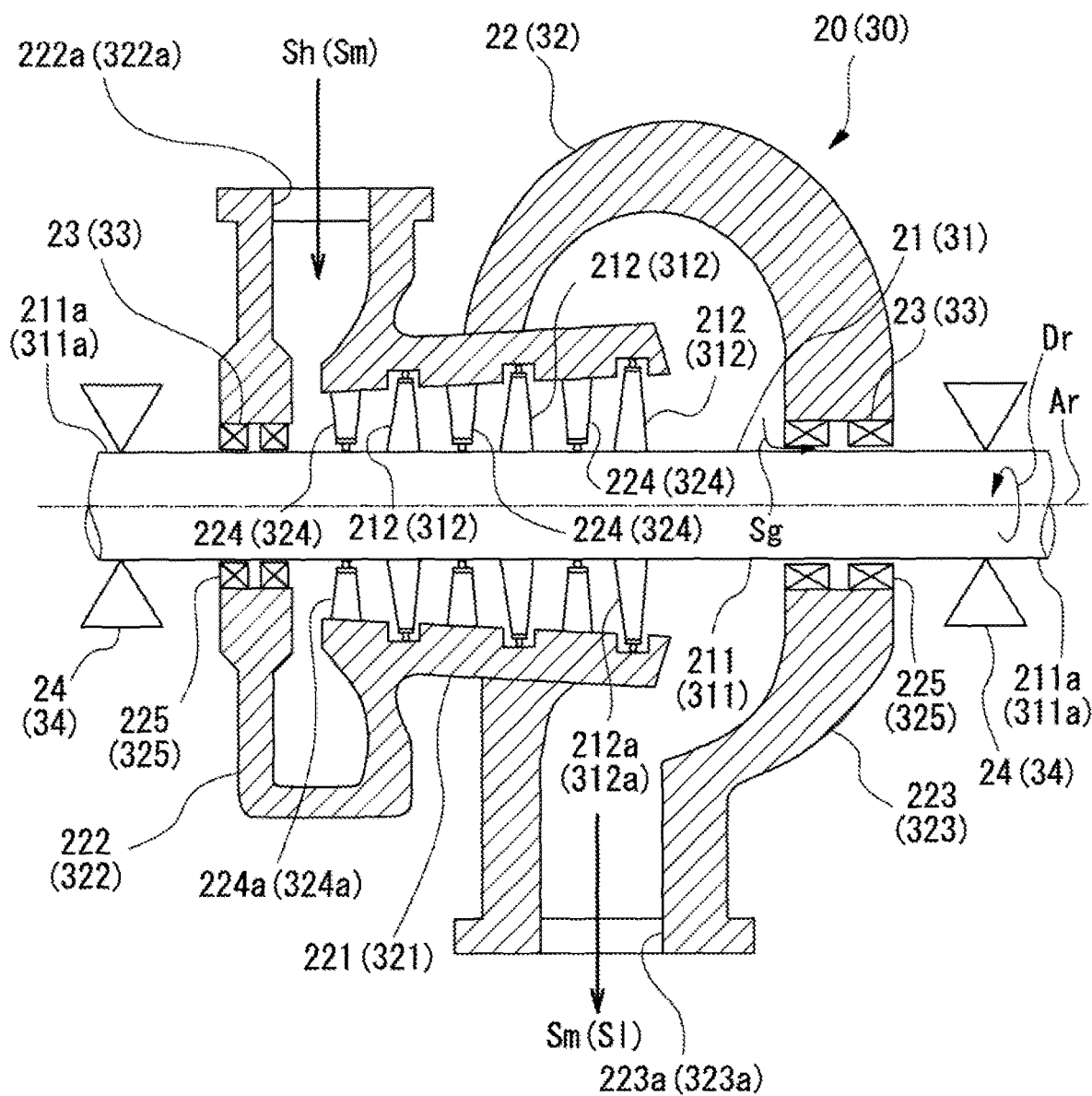
FIG. 2 is a sectional view of a high-pressure side steam turbine that constitutes the steam turbine plant in the first embodiment according to the present invention.
Figure 3:
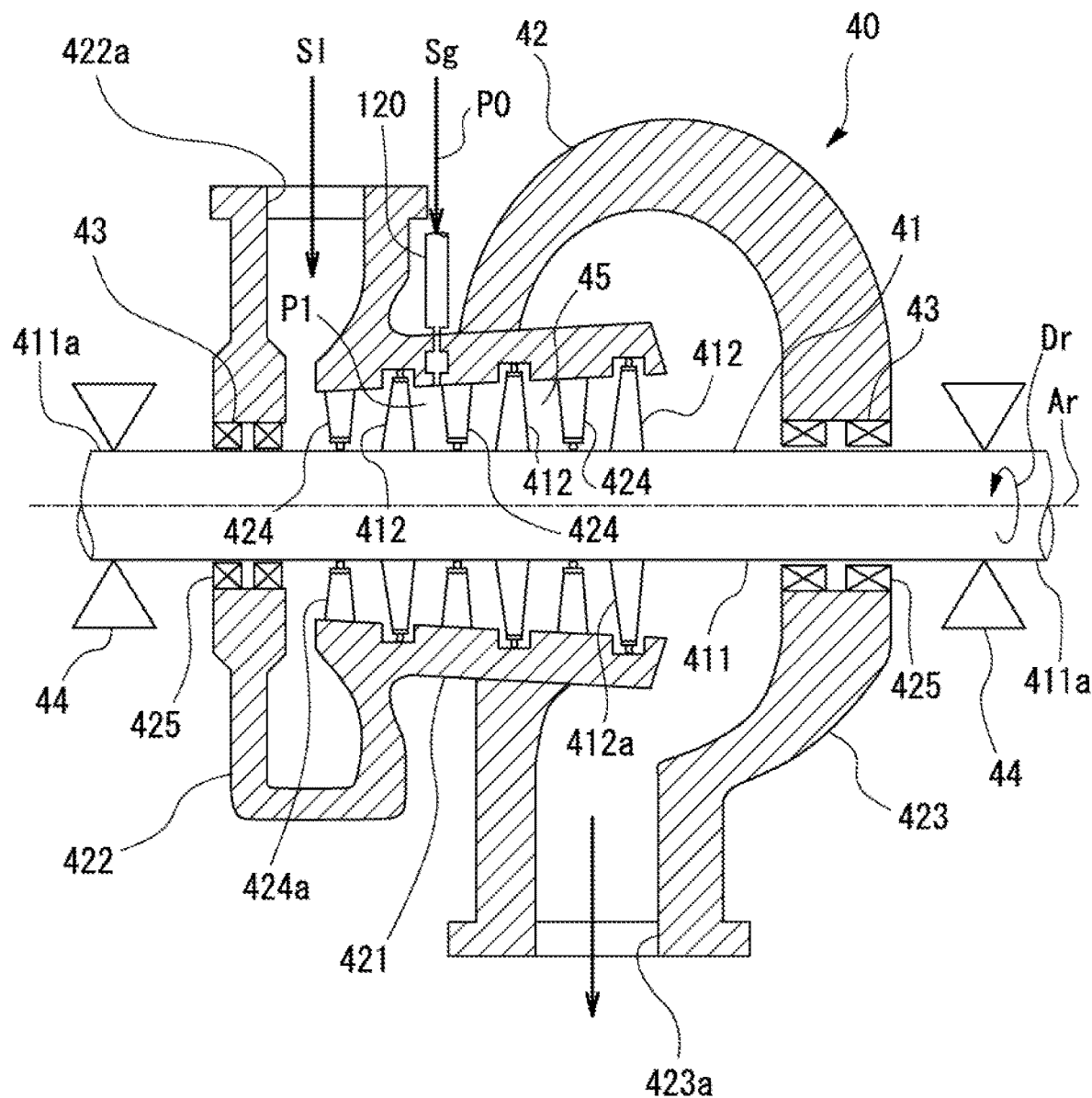
FIG. 3 is a sectional view of a low-pressure side steam turbine that constitutes the steam turbine plant in the first embodiment according to the present invention.
Figure 4:
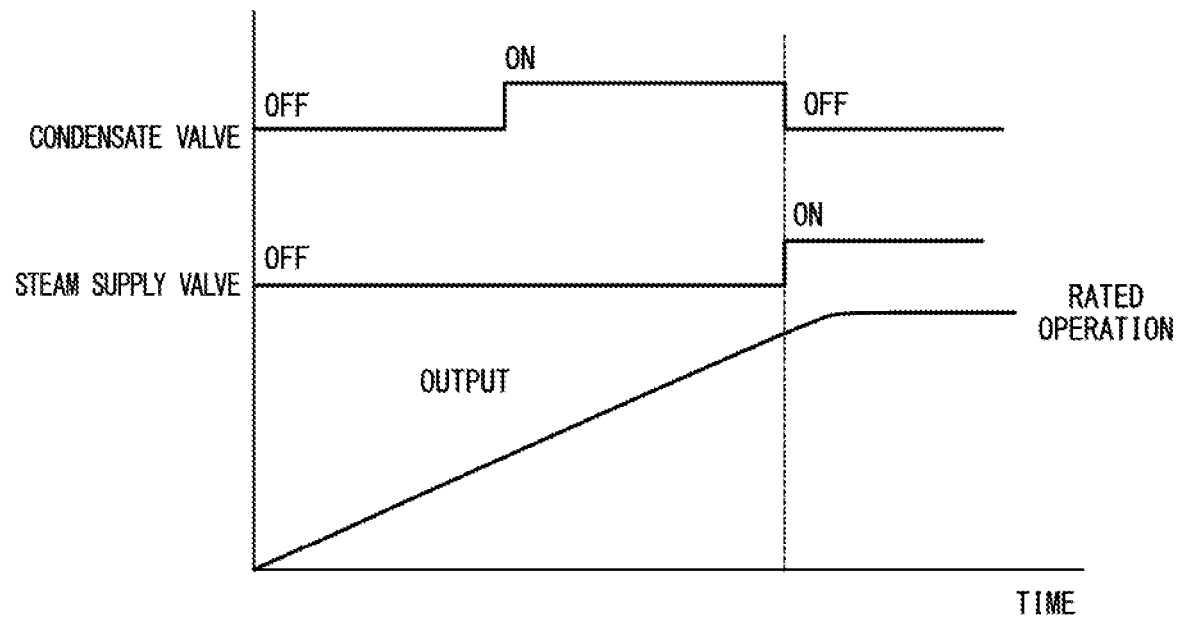
FIG. 4 is a line graph illustrating a supply mode of gland steam when the steam turbine plant in the first embodiment according to the present invention is started

FIG. 1 is a schematic view illustrating a constitution of a steam turbine plant according to a first embodiment of the present invention. FIG. 2 is a sectional view of a high-pressure side steam turbine that constitutes the steam turbine plant according to the first embodiment of the present invention. FIG. 3 is a sectional view of a low-pressure side steam turbine that constitutes the steam turbine plant according to the first embodiment of the present invention. FIG. 4 is a line graph illustrating a supply mode of gland steam when the steam turbine plant according to the first embodiment of the present invention is started.

As illustrated in FIG. 1, a steam turbine plant 10 of the present embodiment mainly includes a boiler 11, a high-pressure steam turbine (a high-pressure side steam turbine) 20, a medium-pressure steam turbine (a high-pressure side steam turbine) 30, a low-pressure steam turbine (a low-pressure side steam turbine) 40, a condenser 15, a condensate pump 16, and a steam seal mechanism 50.

The boiler 11 generates steam. Here, a heat source of the boiler 11 is inconsequential, and for example, heat of an exhaust gas from a turbine (not shown) may be used. The boiler 11 includes an evaporator 111, a superheater 112, and a reheater 113.

High-pressure steam Sh generated in the boiler 11 by passing through the evaporator 111 and the superheater 112 is fed into the high-pressure steam turbine 20 via a high-pressure steam line 101. As illustrated in FIG. 2, the high-pressure steam turbine 20 includes a high-pressure casing 22 into which steam flows from the high-pressure steam line 101, a high-pressure turbine rotor 21 that is provided in the high-pressure casing 22, and high-pressure gland portions 23.

The high-pressure casing 22 integrally includes a tubular casing 221, an inlet scroll 222 that is provided on a first side of the casing 221 in a direction of an axis Ar, and an outlet scroll 223 that is provided on a second side of the casing 221 in the direction of the axis Ar. In the high-pressure casing 22, the high-pressure steam Sh generated in the boiler 11 flows from a steam suction port 222a, which is formed in the inlet scroll 222, into the casing 221 through the high-pressure steam line 101. The in-flowing high-pressure steam Sh flows through the casing 221 from the vicinity of the inlet scroll 222 toward the vicinity of the outlet scroll 223, and is discharged outward from a steam discharge port 223a formed in the outlet scroll 223.

A plurality of stages of turbine vane rows 224 provided to be spaced apart from each other in the direction of the axis Ar are provided on an inner circumferential side of the casing 221. Each turbine vane row 224 includes a plurality of turbine vanes 224a at intervals in a circumferential direction Dr around the axis Ar.

The high-pressure turbine rotor 21 includes a rotational shaft 211 that extends in the direction of the axis Ar, and turbine blade rows 212 that are integrally provided on an outer surface of the rotational shaft 211 in a radial direction.

The rotational shaft 211 is provided with both ends 211a and 211a thereof facing outward from openings 225 and 225 of the high-pressure casing 22 which are formed on both sides of the high-pressure casing 22 in the direction of the axis Ar. Both ends 211a and 211a of the rotational shaft 211 are supported outside the high-pressure casing 22 to be rotatable around the axis Ar by bearings 24.

The turbine blade rows 212 are integrally formed on an outer circumferential portion of the rotational shaft 211. The turbine blade rows 212 are provided to be spaced apart from each other in a plurality of stages in the direction of the axis Ar of the rotational shaft 211. Each stage of the turbine blade rows 212 is disposed to be spaced apart from each stage of the turbine vane rows 224 provided in a plurality of stages in the direction of the axis Ar. Each turbine blade row 212 includes a plurality of blades 212a at intervals in the circumferential direction Dr around the axis Ar. In the high-pressure turbine rotor 21, a swirl flow of the high-pressure steam Sh which is generated by each stage of the turbine vane rows 224 collides with the blades 212a of each turbine blade row 212, and thereby each stage of the turbine blade rows 212 and the rotational shaft 211 are integrally rotated around the axis Ar.

Some of the high-pressure steam Sh in the casing 221 flows into a gap between the opening 225 of the high-pressure casing 22 and the end 211a of the high-pressure turbine rotor 21 as the gland steam Sg, and thereby the high-pressure gland portion 23 seals the gap. The gland steam Sg flowing into the high-pressure gland portion 23 is discharged to the gland regulator line 110 (to be described below). Further, some of the gland steam Sg flowing into the high-pressure gland portion 23 is sucked into a gland condenser line 130.

In this high-pressure steam turbine 20, the high-pressure steam Sh fed from the boiler 11 via the high-pressure steam line 101 rotatably drives the high-pressure turbine rotor 21 while undergoing decompression and expansion in the casing 221. The high-pressure steam turbine 20 outputs a rotational force of the rotational shaft 211 of the high-pressure turbine rotor 21 to the outside.

In the medium-pressure steam turbine 30, medium-pressure steam Sm discharged after the high-pressure steam Sh undergoes decompression and expansion in the high-pressure steam turbine 20 is fed via a medium-pressure steam line 102. As illustrated in FIG. 2, the medium-pressure steam line 102 passes through the reheater 113 provided in the boiler 11, and thereby the medium-pressure steam Sm discharged from the high-pressure steam turbine 20 is heated by the reheater 113. The medium-pressure steam turbine 30 includes a medium-pressure casing 32 into which steam flows from the medium-pressure steam line 102, a medium-pressure turbine rotor 31 provided in the medium-pressure casing 32, and medium-pressure gland portions 33.

The medium-pressure casing 32 integrally includes a tubular casing 321, an inlet scroll 322 that is provided on a first side of the casing 321 in the direction of the axis Ar, and an outlet scroll 323 that is provided on a second side of the casing 321 in the direction of the axis Ar. In the medium-pressure casing 32, the medium-pressure steam Sm discharged from the high-pressure steam turbine 20 flows from a steam suction port 322a, which is formed in the inlet scroll 322, into the casing 321 through the medium-pressure steam line 102. The in-flowing medium-pressure steam Sm flows through the casing 321 from the vicinity of the inlet scroll 322 toward the vicinity of the outlet scroll 323, and is discharged outward from a steam discharge port 323a formed in the outlet scroll 323

A plurality of stages of turbine vane rows 324 provided to be spaced apart from each other in the direction of the axis Ar are provided on an inner circumferential side of the casing 321. Each turbine vane row 324 includes a plurality of turbine vanes 324a at intervals in the circumferential direction Dr around the axis Ar.

The medium-pressure turbine rotor 31 includes a rotational shaft 311 that extends in the direction of the axis Ar, and turbine blade rows 312 that are integrally provided on an outer surface of the rotational shaft 311 in a radial direction.

The rotational shaft 311 is provided with both ends 311a and 311a thereof facing outward from openings 325 and 325 of the medium-pressure casing 32 which are formed on both sides of the medium-pressure casing 32 in the direction of the axis Ar. Both ends 311a and 311a of the rotational shaft 311 are supported outside the medium-pressure casing 32 to be rotatable around the axis Ar by bearings 34.

The turbine blade rows 312 are integrally formed on an outer circumferential portion of the rotational shaft 311. The turbine blade rows 312 are provided to be spaced apart from each other in a plurality of stages in the direction of the axis Ar of the rotational shaft 311. Each stage of the turbine blade rows 312 is disposed to be spaced apart from each stage of the turbine vane rows 324 provided in a plurality of stages in the direction of the axis Ar. Each turbine blade row 312 includes a plurality of blades 312a at intervals in the circumferential direction Dr around the axis Ar. In the medium-pressure turbine rotor 31, a swirl flow of the medium-pressure steam Sm which is generated by each stage of the turbine vane rows 324 collides with the blades 312a of each turbine blade row 312, and thereby each stage of the turbine blade rows 312 and the rotational shaft 311 are integrally rotated around the axis Ar.

Some of the medium-pressure steam Sm in the casing 321 flows into a gap between the opening 325 of the medium-pressure casing 32 and the end 311a of the medium-pressure turbine rotor 31 as gland steam Sg, and thereby the medium-pressure gland portion 33 seals the gap. The gland steam Sg flowing into the medium-pressure gland portion 33 is discharged to the gland regulator line 110 (to be described below). Further, some of the gland steam Sg flowing into the medium-pressure gland portion 33 is sucked into the gland condenser line 130.

The medium-pressure steam Sm is fed into this medium-pressure steam turbine 30 via the medium-pressure steam line 102. The medium-pressure steam Sm rotatably drives the medium-pressure turbine rotor 31 while undergoing decompression and expansion in the casing 321 of the medium-pressure steam turbine 30. The medium-pressure steam turbine 30 outputs a rotational force of the rotational shaft 311 of the medium-pressure turbine rotor 31 to the outside.

In the low-pressure steam turbine 40, low-pressure steam Sl discharged after the medium-pressure steam Sm undergoes decompression and expansion in the medium-pressure steam turbine 30 is fed via a low-pressure steam line 103. As illustrated in FIG. 3, the low-pressure steam turbine 40 includes a low-pressure casing 42 into which steam flows from the low-pressure steam line 103, a low-pressure turbine rotor 41 provided in the low-pressure casing 42, and low-pressure gland portions 43.

The low-pressure casing 42 integrally includes a tubular casing 421, an inlet scroll 422 that is provided on a first side of the casing 421 in the direction of the axis Ar, and an outlet scroll 423 that is provided on a second side of the casing 421 in the direction of the axis Ar. In the low-pressure casing 42, the low-pressure steam Sl discharged from the medium-pressure steam turbine 30 flows from a steam suction port 422a, which is formed in the inlet scroll 422, into the casing 421 through the low-pressure steam line 103. The in-flowing low-pressure steam Sl flows through the casing 421 from the vicinity of the inlet scroll 422 toward the vicinity of the outlet scroll 423, and is discharged outward from a steam discharge port 423a formed in the outlet scroll 423

A plurality of stages of turbine vane rows 424 provided to be spaced apart from each other in the direction of the axis Ar are provided on an inner circumferential side of the casing 421. Each turbine vane row 424 includes a plurality of turbine vanes 424a at intervals in the circumferential direction Dr around the axis Ar.

The low-pressure turbine rotor 41 includes a rotational shaft 411 that extends in the direction of the axis Ar, and turbine blade rows 412 that are integrally provided on an outer surface of the rotational shaft 411 in a radial direction.

The rotational shaft 411 is provided such that both ends 411a and 411a thereof extend outward from openings 425 and 425 of the low-pressure casing 42 which are formed on both sides of the low-pressure casing 42 in the direction of the axis Ar. Both ends 411a and 411a of the rotational shaft 411 are supported outside the low-pressure casing 42 to be rotatable around the axis Ar by bearings 44.

The turbine blade rows 412 are integrally formed on an outer circumferential portion of the rotational shaft 411. The turbine blade rows 412 are provided to be spaced apart from each other in a plurality of stages in the direction of the axis Ar of the rotational shaft 411. Each stage of the turbine blade rows 412 is disposed to be spaced apart from each stage of the turbine vane rows 424 provided in a plurality of stages in the direction of the axis Ar. Each turbine blade row 412 includes a plurality of blades 412a at intervals in the circumferential direction Dr around the axis Ar. In the low-pressure turbine rotor 41, a swirl flow of the low-pressure steam Sl which is generated by each stage of the turbine vane rows 424 collides with the blades 412a of each turbine blade row 412, and thereby each stage of the turbine blade rows 412 and the rotational shaft 411 are integrally rotated around the axis Ar.

In the low-pressure steam turbine 40, an annular sectional space between an inner circumferential surface of the casing 421 and an outer circumferential surface of the rotational shaft 411 of the low-pressure turbine rotor 41 serves as a main steam flow passage (a flow passage) 45 along which the low-pressure steam Sl flows.

The low-pressure gland portion 43 supplies gland steam Sg, which flows in via the gland regulator line 110, to a gap between the opening 425 of the low-pressure casing 42 and the end 411a of the low-pressure turbine rotor 41, and thereby seals the gap. The gland steam Sg flowing into the low-pressure gland portion 43 is discharged to the gland condenser line 130 (to be described below).

The low-pressure steam Sl is fed into the low-pressure steam turbine 40 via the low-pressure steam line 103. The low-pressure steam Sl rotatably drives the low-pressure turbine rotor 41 while undergoing decompression and expansion in the casing 421 of the low-pressure steam turbine 40. The low-pressure steam turbine 40 outputs a rotational force of the rotational shaft 411 of the low-pressure turbine rotor 41.

The condenser 15 is connected to the low-pressure casing 42 of the low-pressure steam turbine 40. Steam exhausted from the low-pressure steam turbine 40 flows into the condenser 15, and the condenser 15 restores the steam to water by heat exchange.

The condensate pump 16 is provided on a feedwater line 105 that connects the condenser 15 and the boiler 11, and sends water inside the condenser 15 to the boiler 11.

The steam seal mechanism 50 includes the gland regulator line 110, a rotor-driving steam supply line 120, and the gland condenser line 130.

The gland regulator line 110 guides the gland steam Sg from the high-pressure gland portion 23 and the medium-pressure gland portion 33 to the low-pressure gland portion 43.

The gland condenser line 130 collects the gland steam Sg that is discharged from the high-pressure gland portion 23 of the high-pressure steam turbine 20, the medium-pressure gland portion 33 of the medium-pressure steam turbine 30, and the low-pressure gland portion 43 of the low-pressure steam turbine 40, and feeds the gland steam Sg into a gland condenser 18. The gland condenser 18 performs heat exchange between the water flowing along the feedwater line 105 and the gland steam Sg fed through the gland condenser line 130. Thereby, the water from the condenser 15 is heated, and the gland steam Sg is cooled. The gland steam Sg cooled by the gland condenser 18 is fed into the condenser 15 through a connecting pipe 106, and is restored to water.

The rotor-driving steam supply line 120 is a line that branches off from the gland regulator line 110. The rotor-driving steam supply line 120 supplies some of the gland steam Sg, which is fed from the high-pressure gland portion 23 of the high-pressure steam turbine 20 and the medium-pressure gland portion 33 of the medium-pressure steam turbine 30 through the gland regulator line 110, to the main steam flow passage 45 of the steam that rotates the low-pressure turbine rotor 41 in the low-pressure casing 42. Here, as illustrated in FIG. 3, the rotor-driving steam supply line 120 is connected to a portion which is located in the low-pressure casing 42 and at which a pressure P1 is lower than a pressure P0 of the gland steam Sg supplied from the gland regulator line 110. To be specific, the rotor-driving steam supply line 120 is connected to the low-pressure casing 42 on an upstream side of the second and subsequent stages of turbine vane rows 424 excluding the most upstream side of a flow direction of steam and a downstream side of the turbine blade row 412 disposed on an upstream side of these turbine vane rows 424 in the main steam flow passage 45 of the low-pressure casing 42 among the plurality of stages of turbine vane rows 424.

The gland steam Sg fed through the rotor-driving steam supply line 120 joins the steam inside the casing 421 which flows along the main steam flow passage 45, and rotates the low-pressure turbine rotor 41.

Here, as illustrated in FIG. 1, the steam seal mechanism 50 includes a temperature reducer 55 that reduces a temperature of the gland steam Sg flowing along the rotor-driving steam supply line 120, a flow control valve 56 that adjusts a flow rate of the gland steam Sg flowing along the rotor-driving steam supply line 120, and a correlation value detector 56s that detects a steam flow rate correlation value that correlates with the flow rate of the gland steam Sg flowing along the gland regulator line 110.

The flow control valve 56 is opened when the steam flow rate correlation value detected by the correlation value detector 56s is greater than or equal to a preset value, and increases the flow rate of the gland steam Sg flowing along the rotor-driving steam supply line 120. Here, the steam flow rate correlation value detected by the correlation value detector 56s includes, for example, a pressure P0 of the gland steam Sg, plant output of the steam turbine plant 10, or the like in addition to a flow rate itself of the gland steam Sg.

Further, the steam seal mechanism 50 includes an exhaust line 140 that branches off from the gland regulator line 110 and reaches the condenser 15. An on-off valve 19 that connects/disconnects the exhaust line 140 is provided on the exhaust line 140.

For example, as illustrated in FIG. 4, at the time of starting of the steam turbine plant 10, when plant output is small, an amount of the steam generated by the boiler 11 becomes insufficient to seal the high-pressure gland portion 23 of the high-pressure steam turbine 20, the medium-pressure gland portion 33 of the medium-pressure steam turbine 30, and the low-pressure gland portion 43 of the low-pressure steam turbine 40. In this state, the on-off valve 19 provided on the exhaust line 140 and the flow control valve 56 provided on the gland regulator line 110 are closed. This can curb outflow of the steam from the high-pressure gland portion 23, the medium-pressure gland portion 33, and the low-pressure gland portion 43, and stabilize operations of the high-pressure steam turbine 20, the medium-pressure steam turbine 30, and the low-pressure steam turbine 40. In this state, gland steam Sg from an auxiliary boiler (not shown) connected to the gland regulator line 110 can be supplied to the low-pressure gland portion 43 of the low-pressure steam turbine 40, and perform sealing on the low-pressure gland portion 43.

After starting of the steam turbine plant 10, at a point in time when a preset time has elapsed or at a point in time when a steam flow rate correlation value is greater than or equal to a certain value, the on-off valve 19 provided on the exhaust line 140 is opened. At this point in time, a flow rate of the gland steam Sg fed from the gland regulator line 110 into the low-pressure gland portion 43 becomes a flow rate sufficient to seal the low-pressure gland portion 43. Therefore, after this point in time, a flow rate of the gland steam Sg flowing along the gland regulator line 110 exceeds a steam flow rate required to seal the low-pressure gland portion 43. Thus, as described above, the on-off valve 19 is opened, and surplus steam that excludes steam required to seal the low-pressure gland portion 43 among the gland steam Sg flowing along the gland regulator line 110 is sent to the condenser 15 via the exhaust line 140. In the condenser 15, the gland steam Sg from the exhaust line 140 is restored to water.

In a case where a time has elapsed again and accordingly, it is detected by the correlation value detector 56s that plant output (a steam flow rate correlation value) is greater than or equal to a preset value, the on-off valve 19 provided on the exhaust line 140 is closed, and the flow control valve 56 provided on the rotor-driving steam supply line 120 is opened. Thereby, the surplus gland steam Sg sent to the condenser 15 is sent to the main steam flow passage 45 of the low-pressure casing 42 via the rotor-driving steam supply line 120. The gland steam Sg takes charge of a part of an energy source that rotates the low-pressure turbine rotor 41.

As described above, at a point in time when the on-off valve 19 is opened, surplus steam excluding steam required to seal the low-pressure gland portion 43 is included in the gland steam Sg flowing along the gland regulator line 110. However, at this point in time, a pressure or a flow rate of the gland steam Sg flowing along the gland regulator line 110 is unstable, and a flow rate of the surplus steam is too small to take charge of a part of energy that rotates the low-pressure turbine rotor 41. For this reason, in the present embodiment, even if surplus steam is generated, the surplus steam is immediately sent to the condenser 15 without sending the surplus steam to the main steam flow passage 45 of the low-pressure casing 42.

According to the steam turbine plant 10 as described above, some of the gland steam Sg, which is extracted from the high-pressure gland portion 23 of the high-pressure steam turbine 20 and the medium-pressure gland portion 33 of the medium-pressure steam turbine 30 and is fed into the low-pressure gland portion 43 of the low-pressure steam turbine 40, is supplied to the main steam flow passage 45 of steam that rotates the low-pressure turbine rotor 41 in the low-pressure casing 42 of the low-pressure steam turbine 40. Thus, some of the gland steam Sg can be used as the energy that rotates the low-pressure turbine rotor 41. In this way, the low-pressure turbine rotor 41 is directly rotated by the gland steam Sg, and thereby energy of the gland steam Sg can be effectively used. Therefore, plant efficiency can be improved in the steam turbine plant 10.

Further, the rotor-driving steam supply line 120 is made to supply some of the gland steam Sg to a portion which is located in the low-pressure casing 42 and at which a pressure is lower than the gland steam Sg supplied from the gland regulator line 110. Thereby, the gland steam Sg can be efficiently supplied into the low-pressure casing 42 through the rotor-driving steam supply line 120. For this reason, it is possible to more efficiently rotate the low-pressure turbine rotor 41.

Further, the steam seal mechanism 50 includes the flow control valve 56 that adjusts the flow rate of the gland steam Sg flowing along the rotor-driving steam supply line 120. Thus, depending on operational situations of the high-pressure steam turbine 20, the medium-pressure steam turbine 30, and the low-pressure steam turbine 40, an optimum amount of gland steam Sg required in the low-pressure steam turbine 40 can be appropriately supplied.

Further, the flow control valve 56 is opened when the steam flow rate correlation value detected by the correlation value detector 56s is greater than or equal to a preset value. With this constitution, in a case where the flow rate of the gland steam Sg sent out from the high-pressure steam turbine 20 and the medium-pressure steam turbine 30 exceeds the flow rate of the gland steam Sg required in the low-pressure steam turbine 40 and excessive gland steam Sg is generated, the flow rate of the gland steam Sg flowing along the rotor-driving steam supply line 120 is increased, and thereby excessive gland steam Sg can be effectively used as driving energy for rotating the low-pressure turbine rotor 41 of the low-pressure steam turbine 40.

Further, the rotor-driving steam supply line 120 is connected to the low-pressure casing 42 on the upstream side of the second and subsequent stages of turbine vane rows 424 excluding the most upstream side of the flow direction of steam in the low-pressure casing 42, and on the downstream side of the turbine blade row 412 disposed on the upstream side of these turbine vane rows 424 among the plurality of stages of turbine vane rows 424. With this constitution, obstructing rotation of the turbine blade rows 412 due to the fed gland steam Sg can be prevented.

Second Embodiment

Next, a second embodiment of the steam turbine plant according to the present invention will be described, in the second embodiment to be described below, the components common with those of the first embodiment are given the same reference signs in the drawings, and description thereof will be omitted. The second embodiment is different from the first embodiment in that gland steam Sg fed into a low-pressure steam turbine 40B through a rotor-driving steam supply line 120B is supplied to a position that faces the outside of turbine blade rows 412 in a radial direction.

Figure 5:
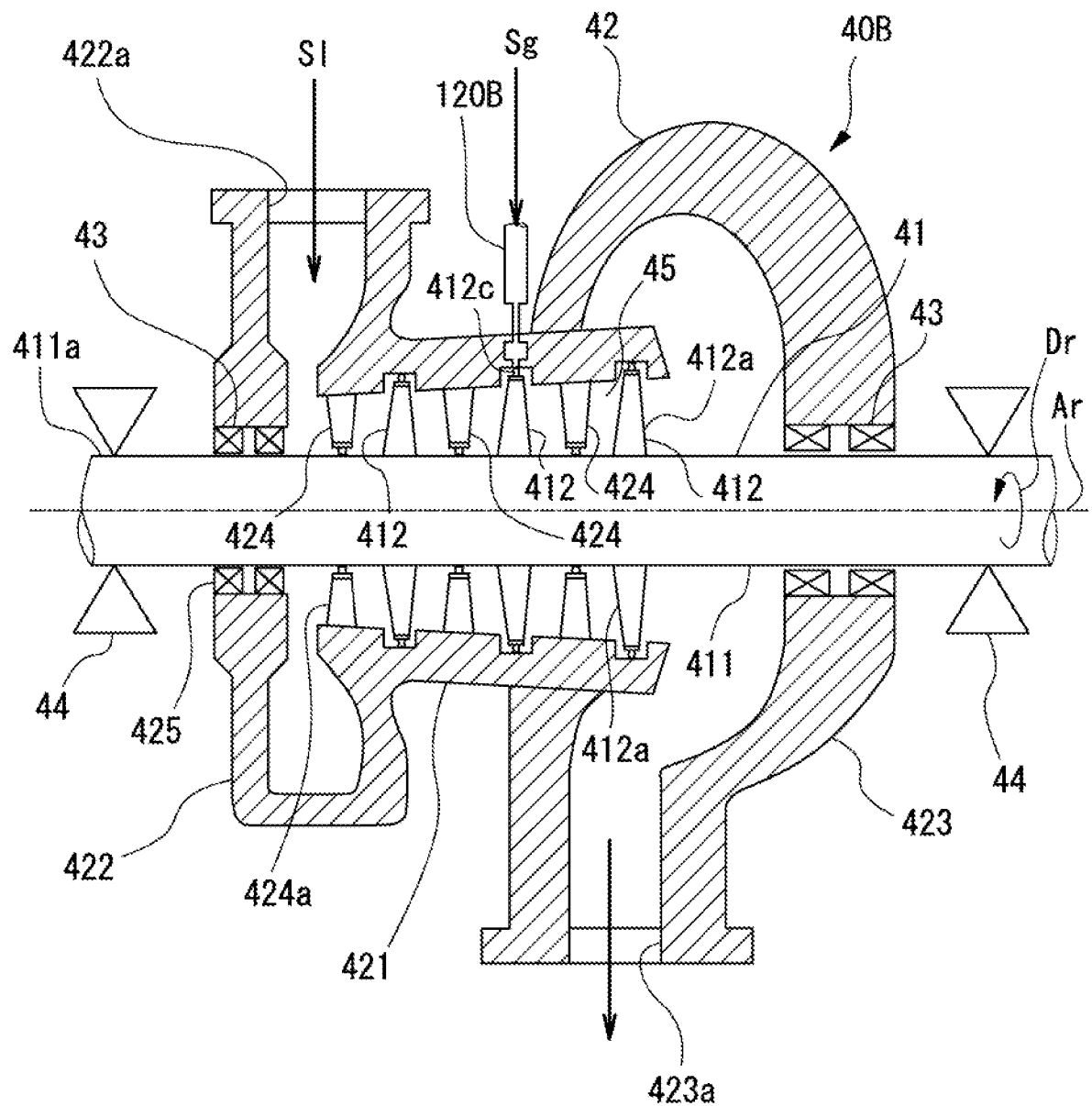
FIG. 5 is a sectional view of a low-pressure side steam turbine constituting a steam turbine plant in a second embodiment according to the present invention.

FIG. 5 is a sectional view of a low-pressure side steam turbine constituting a steam turbine plant in a second embodiment according to the present invention.

As illustrated in FIG. 5, a rotor-driving steam supply line 120B in the low-pressure steam turbine 40B in this embodiment is connected to face the outside of at least one stage of the turbine blade rows 412 in the radial direction among a plurality of stages of turbine blade rows 412 provided in the low-pressure steam turbine 40B. To be specific, the rotor-driving steam supply line 120B is connected at a position that is opposite to tips 412c provided at tip portions of blades 412a of the turbine blade row 412 from the outside in the radial direction.

In this constitution, gland steam Sg supplied into a low-pressure casing 42 through the rotor-driving steam supply line 120B is fed from a position that faces the outside of the turbine blade row 412 in the radial direction.

According to the steam turbine plant as described above, the gland steam Sg supplied into the low-pressure casing 42 through the rotor-driving steam supply line 120B is fed from the position that faces the outside of the turbine blade row 412 in the radial direction, and thereby the fed gland steam Sg can be prevented from obstructing rotation of the turbine blade row 412. Further, sealability of a gap between an outer circumferential portion of a low-pressure turbine rotor 41 and an inner circumferential surface of the low-pressure casing 42 on an outer circumferential side thereof can be enhanced by the gland steam Sg fed from the rotor-driving steam supply line 120.

Modification of the Embodiment

Figure 6:
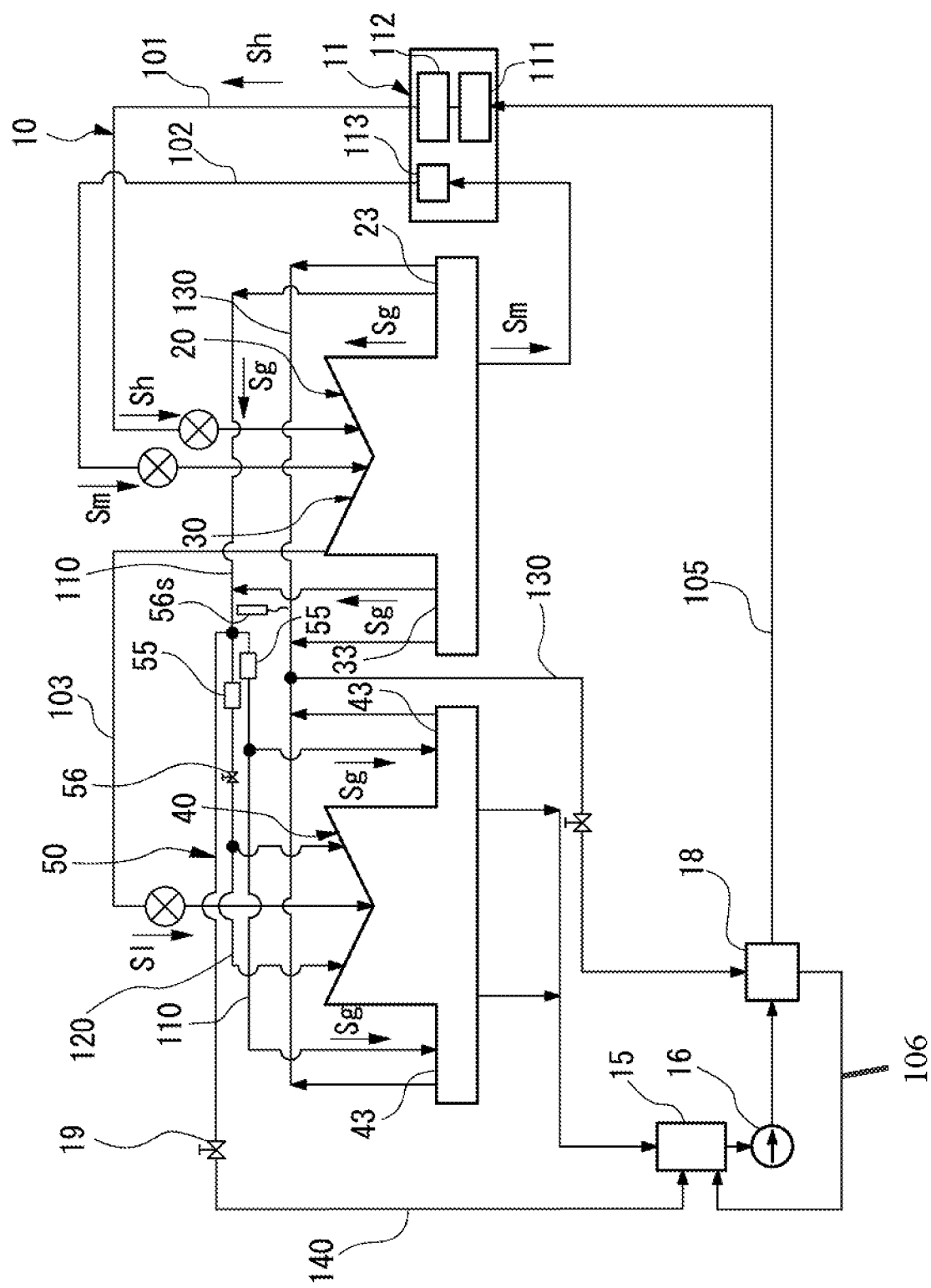
FIG. 6 is a flow sheet illustrating a modification of the steam turbine plant in the first and second embodiments according to the present invention.

In the first and second embodiments, as illustrated in FIG. 6, temperature reducers 55 may be provided on both a gland regulator line 110 and a rotor-driving steam supply line 120.

Further, the steam turbine plant 10 of the first and second embodiments includes the exhaust line 140, but may omit the exhaust line 140. In this case, a flow control valve 56 is opened at a timing that is basically identical to a timing of opening an on-off valve 19.

In each embodiment, the high-pressure casing 22 and the medium-pressure casing 32 are mutually connected and integrated to form a single casing. In addition, in each embodiment, the low-pressure casing 42 is independent of the high-pressure casing 22 and the medium-pressure casing 32. However, a connecting relationship of the casings 22, 32 and 42 of the steam turbines 20, 30 and 40 is not limited to the above form. For example, the high-pressure casing 22, the medium-pressure casing 32, and the low-pressure casing 42 may be mutually connected and integrated to form a single casing. Further, for example, the medium-pressure casing 32 and the low-pressure casing 42 may be mutually connected and integrated to form a single casing, and the high-pressure casing 22 may be independent of the other casings. Further, for example, the high-pressure casing 22, the medium-pressure casing 32, and the low-pressure casing 42 may be independently of one another.

While embodiments of the present invention have been described in detail with reference to the drawings, the components in each embodiment and combinations thereof are one example, and additions, omissions, substitutions, and other modifications of the constitution are possible without departing from the spirit of the present invention. Further, the present invention is not limited by the embodiments, but is only limited by the claims.

INDUSTRIAL APPLICABILITY

In an aspect of the present invention, the effective use of gland steam can be realized, and plant efficiency can be improved.

REFERENCE SIGNS LIST

10 Steam turbine plant
11 Boiler
12 Heater

15 Condenser
16 Condensate pump
18 Gland condenser
19 On-off valve
20 High-pressure steam turbine
21 High-pressure turbine rotor
22 High-pressure casing
23 High-pressure gland portion
24 Bearing
30 Medium-pressure steam turbine
31 Medium-pressure turbine rotor
32 Medium-pressure casing
33 Medium-pressure gland portion
34 Bearing
40 Low-pressure steam turbine
40B Low-pressure steam turbine
41 Low-pressure turbine rotor
42 Low-pressure casing
43 Low-pressure gland portion
44 Bearing
45 Main steam flow passage
50 Steam seal mechanism
55 Temperature reducer
56 Flow control valve
56s Correlation value detector
101 High-pressure steam line
102 Medium-pressure steam line
103 Low-pressure steam line
105 Feedwater line
106 Connecting pipe
110 Gland regulator line
111 Evaporator
112 Superheater
113 Reheater
120 Rotor drive steam supply line
120B Rotor drive steam supply line
130 Gland condenser line
140 Exhaust line
211 Rotational shaft
211a End
212 Turbine blade row
212a Blade
221 Casing
222 Inlet scroll
222a Steam suction port
223 Outlet scroll
223a Steam discharge port
224 Turbine vane row
224a Vane
225 Opening
311 Rotational shaft
311a End
312 Turbine blade row
312a Blade
321 Casing
322 Inlet scroll
322a Steam suction port
323 Outlet scroll
323a Steam discharge part
324 Turbine vane row
324a Vane
325 Opening
411 Rotational shaft
411a End
412 Turbine blade row
412a Blade
412c Tip
421 Casing
422 Inlet scroll
422a Steam suction port
423 Outlet scroll
423a Steam discharge port
424 Turbine vane row
424a Vane
425 Opening
Ar Axis
Dr Circumferential direction
P0 Pressure
P1 Pressure
Sg Gland steam
Sh High-pressure steam
Sl Low-pressure steam
Sm Medium-pressure steam

The invention claimed is:

1. A steam turbine plant comprising:
a high-pressure side steam turbine configured to have a high-pressure casing into which steam is configured to flow and a high-pressure turbine rotor which is provided in the high-pressure casing, both ends of which face outward from openings formed in the high-pressure casing, and which is configured to be rotated by the steam flowing into the high-pressure casing;
a low-pressure side steam turbine configured to have a low-pressure casing into which the steam exhausted from the high-pressure side steam turbine is configured to flow and a low-pressure turbine rotor which is provided in the low-pressure casing, both ends of which face outward from openings formed in the low-pressure casing, and which is configured to be rotated by the steam flowing into the low-pressure casing; and
a condenser which restores a steam exhausted from the low-pressure side steam turbine into water,
wherein the high-pressure side steam turbine has high-pressure gland portions that are configured to supply the steam to gaps between the openings of the high-pressure casing and the ends of the high-pressure turbine rotor as gland steam and thereby are configured to seal the gaps,
the low-pressure side steam turbine has low-pressure gland portions that are configured to supply the gland steam to gaps between the openings of the low-pressure casing and the ends of the low-pressure turbine rotor and thereby are configured to seal the gaps, and
the steam turbine plant further comprises
a gland regulator line configured to guide the gland steam from the high-pressure gland portions to the low-pressure gland portions,
a rotor-driving steam supply line configured to branch off from the gland regulator line and to supply some of the gland steam to a flow passage of the steam that rotates the low-pressure turbine rotor in the low-pressure casing,
a flow control valve configured to adjust a flow rate of the gland steam flowing along the rotor-driving steam supply line,
a correlation value detector configured to detect a steam flow rate correlation value that correlates to a flow rate of the gland steam flowing along the gland regulator line,
an exhaust line which branches off from the gland regulator line and carries a part of the gland steam to the condenser, and
an on-off valve provided on the exhaust line, wherein the flow control valve is opened when the steam flow rate correlation value detected by the correlation value detector is greater than or equal to a preset value.

2. The steam turbine plant according to claim 1, wherein the rotor-driving steam supply line is configured to supply some of the gland steam to a portion that is located in the low-pressure casing and at which a pressure is lower than the gland steam supplied from the gland regulator line.

3. The steam turbine plant according to claim 1, wherein:
the low-pressure side steam turbine includes:
   a plurality of stages of turbine vane rows that are fixed to an inner circumferential side of the low-pressure casing and are provided to be spaced apart from one another in a direction of an axis of the low-pressure turbine rotor; and
   a plurality of stages of turbine blade rows that are formed at an outer circumferential portion of the low-pressure turbine rotor and are provided to be spaced apart from each of the stages of turbine vane rows in the direction of the axis, and
the rotor-driving steam supply line is connected to the low-pressure casing on an upstream side of the second and subsequent stages of turbine vane rows excluding a most upstream side of a flow direction of the steam in the low-pressure casing, and on a downstream side of the turbine blade row disposed adjacent to the upstream side of these turbine vane rows among the plurality of stages of turbine vane rows.

4. The steam turbine plant according to claim 1, wherein:
the low-pressure side steam turbine includes:
   a plurality of stages of turbine vane rows that are fixed to an inner circumferential side of the low-pressure casing and are provided to be spaced apart from one another in a direction of an axis of the low-pressure turbine rotor; and
   a plurality of stages of turbine blade rows that are formed at an outer circumferential portion of the low-pressure turbine rotor and are provided to be spaced apart from each of the stages of turbine vane rows in the direction of the axis, and
the rotor-driving steam supply line is connected to the low-pressure casing to face an outside of at least one of the plurality of stages of turbine blade rows in a radial direction.

* * * * *